US011903396B2

(12) United States Patent
Willemsen et al.

(10) Patent No.: US 11,903,396 B2
(45) Date of Patent: Feb. 20, 2024

(54) PROCESS FOR MAKING A SOLUBLE RAPESEED PROTEIN ISOLATE

(71) Applicant: DSM IP ASSETS B.V., Heerlen (NL)

(72) Inventors: Johannes Hendrikus Maria Willemsen, Echt (NL); Johannes Hendrikus Antonius Jeroen Vermunt, Echt (NL); Nienke Nina Hylkema, Echt (NL); Gerardus Johannes Franciscus Smolders, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 521 days.

(21) Appl. No.: 16/314,867

(22) PCT Filed: Jul. 7, 2017

(86) PCT No.: PCT/EP2017/066871
§ 371 (c)(1),
(2) Date: Jan. 3, 2019

(87) PCT Pub. No.: WO2018/007492
PCT Pub. Date: Jan. 11, 2018

(65) Prior Publication Data
US 2019/0307149 A1    Oct. 10, 2019

(30) Foreign Application Priority Data

Jul. 7, 2016 (EP) .................................... 16178345
Apr. 19, 2017 (EP) .................................... 17166993

(51) Int. Cl.
*A23J 1/14* (2006.01)
*A23J 3/14* (2006.01)
(Continued)

(52) U.S. Cl.
CPC .... *A23J 1/14* (2013.01); *A23J 3/14* (2013.01); *A23L 11/30* (2016.08); *A23L 33/185* (2016.08)

(58) Field of Classification Search
CPC .... A23L 33/185; A23L 11/30; A23J 1/14; A23J 3/14
(Continued)

(56) References Cited

U.S. PATENT DOCUMENTS 2,861,061 A    11/1958   Borel et al.
2,861,062 A    11/1958   Borel et al.
(Continued)

FOREIGN PATENT DOCUMENTS

CA        2954314 A1      10/2015
DE    102014005466 A1     10/2015
(Continued)

OTHER PUBLICATIONS

Gerzhova, Alina, et al., "Study of total dry matter and protein extraction from canola meal as affected by the pH, salt addition and use of zeta-potential/turbidimetry analysis to optimize the extraction conditions," Food Chemistry, Elsevier Ltd, NL, vol. 201, Jan. 22, 2016, pp. 243-252, XP029413712.
(Continued)

*Primary Examiner* — Lien T Tran
*Assistant Examiner* — Tynesha L McClain
(74) *Attorney, Agent, or Firm* — McBee Moore & Vanik, IP, LLC

(57) ABSTRACT

The present invention is directed to a process for making a soluble native rapeseed protein isolate and the soluble native rapeseed protein isolate obtained by the process.

13 Claims, 1 Drawing Sheet

(51) Int. Cl.
    *A23L 33/185*     (2016.01)
    *A23L 11/30*     (2016.01)

(58) Field of Classification Search
    USPC .................................................. 426/656
    See application file for complete search history.

(56) References Cited

U.S. PATENT DOCUMENTS

| | | | |
|---|---|---|---|
| 5,844,086 | A | 12/1998 | Murray |
| 6,005,076 | A | 12/1999 | Murray |
| 8,623,445 | B2 | 1/2014 | Tang |
| 9,115,202 | B2 | 8/2015 | Segall et al. |
| 2003/0124241 | A1 | 7/2003 | Westdal |
| 2004/0039174 | A1 | 2/2004 | Barker et al. |
| 2005/0064086 | A1 | 3/2005 | Hiron et al. |
| 2007/0014914 | A1 | 1/2007 | Borders et al. |
| 2007/0098876 | A1 | 5/2007 | Hiron |
| 2010/0041871 | A1 | 2/2010 | Segall et al. |
| 2010/0068370 | A1 | 3/2010 | Segall et al. |
| 2010/0086662 | A1 | 4/2010 | Cox et al. |
| 2010/0136173 | A1 | 6/2010 | Tang |
| 2014/0256914 | A1 | 9/2014 | Green et al. |
| 2015/0073127 | A1 | 3/2015 | Wnukowski et al. |
| 2015/0272171 | A1 | 10/2015 | Lamacchia et al. |
| 2016/0031950 | A1 | 2/2016 | Jaramillo et al. |
| 2017/0027190 | A1 | 2/2017 | Düring et al. |
| 2019/0150473 | A1 | 5/2019 | Willemsen et al. |
| 2019/0254303 | A1 | 8/2019 | Shi et al. |
| 2019/0307149 | A1 | 10/2019 | Willemsen et al. |
| 2019/0307160 | A1 | 10/2019 | Shi et al. |
| 2020/0154732 | A1 | 5/2020 | Shi et al. |
| 2021/0177005 | A1 | 6/2021 | Hylkema et al. |

FOREIGN PATENT DOCUMENTS

| | | | |
|---|---|---|---|
| EP | 1389921 | B1 | 2/2004 |
| EP | 1715752 | B1 | 11/2006 |
| EP | 1720415 | B1 | 11/2006 |
| EP | 2364602 | A1 | 9/2011 |
| EP | 2736351 | A1 | 6/2014 |
| EP | 15200789 | A | 12/2015 |
| EP | 17166993 | | 4/2016 |
| EP | 16178339 | A | 7/2016 |
| EP | 16178340 | A | 7/2016 |
| EP | 16178343 | A | 7/2016 |
| EP | 16178345 | A | 7/2016 |
| EP | 16178347 | A | 7/2016 |
| EP | 16178348 | A | 7/2016 |
| EP | 17166992 | | 4/2017 |
| EP | 3389391 | A1 | 10/2018 |
| EP | 3481218 | B1 | 5/2019 |
| WO | 02/089598 | A1 | 11/2002 |
| WO | 03/034836 | A1 | 5/2003 |
| WO | 03/043439 | A1 | 5/2003 |
| WO | 2005/067729 | A1 | 7/2005 |
| WO | 2005/077201 | A1 | 8/2005 |
| WO | 2008/094434 | A2 | 8/2008 |
| WO | 2010/003245 | A1 | 1/2010 |
| WO | WO-2010003245 | A1 * | 1/2010 ................ A23J 1/14 |
| WO | 2013/000066 | A1 | 1/2013 |
| WO | 2015/114543 | A2 | 8/2015 |
| WO | 2017/102535 | A1 | 6/2017 |
| WO | 2018/007490 | A1 | 1/2018 |
| WO | 2018/007491 | A1 | 1/2018 |
| WO | 2018/007492 | A1 | 1/2018 |
| WO | 2018/007493 | A1 | 1/2018 |
| WO | 2018/007494 | A1 | 1/2018 |
| WO | 2018/007508 | A1 | 1/2018 |

OTHER PUBLICATIONS

Wanasundara, Janitha P.D., et al., "Canola/rapeseed protein-functionality and nutrition," OCL, vol. 23, No. 4, Jul. 1, 2016, p. D407, XP055304289.

International Search Report received from corresponding PCT/EP2017/066871, dated Sep. 7, 2017.
Morr, C.V. et al., "A Collaborative Study to Develop a Standardized Food Protein Solubility Procedure", Journal of Food Science, 1985, pp. 1715-1718, vol. 50.
Aluko, R.E. et al, "Limited enzymatic proteolysis increases the level of incorporation of canola proteins into mayonnaise", Innovated Food Science and Emerging Technologies, Jun. 1, 2005, pp. 195-202, vol. 6.
Campbell, Lisa et al., "Canola/Rapeseed Protein: Future Opportunities and Directions—Workshop Proceedings of IRC 2015", Plants, Apr. 13, 2016, vol. 5, No. 2.
Akbari, Ali et al., "An integrated method of isolating napin an cruciferin from defatted canola meal", LWT—Food Science and Technology, Jun. 3, 2015, pp. 308-315, vol. 64, No. 1.
Karaca, Asli Can et al., "Emulsifying properties of canola and flaxseed protein isolates produced by isoelectric precipitation and salt extraction", Food Research International, Jul. 8, 2011, pp. 2991-2998, vol. 44, No. 9.
International Search Report of International Patent Application No. PCT/EP2017/066872 dated Sep. 8, 2017.
International Search Report of International Patent Application No. PCT/EP2017/066908 dated Sep. 11, 2017.
Opposition to European Patent Application No. 3481216, mailed Mar. 3, 2021.
Notice of Opposition to European Patent Application No. 3481216, mailed Mar. 3, 2021.
Letter accompanying subsequently filed items with the Opposition to European Patent Application No. 3481216, mailed Mar. 3, 2021.
Consolidated List of Citations filed items with the Opposition to European Patent Application No. 3481216.
Oral Presentation Themes 119-146 Abstracts, 14th International Rapeseed Congress, Jul. 2015, Canada.
Annual Information Form for the year ended Mar. 31, 2012, Burcon Nutrascience Corporation, Jun. 25, 2012, pp. 1-74.
Anna-Stina Hoglund et al., "Distribution of Napin and Cruciferin in Developing Rape Seed Embryos 1", Plant Physiol., 1992, pp. 509-515, vol. 98, Department of Cell Research, Uppsala Biomedical Center, Swedish University of Agricultural Sciences, Uppsala, Sweden.
Screw Oil Press—gemco-machine.com/Screw-Oil-Press.html, Aug. 23, 2011.
Kevin Segall, Report about experimentation conducted regarding the rapeseed protein isolates described on EP 3481216 (the opposed patent (OP)) and wo 2013/000066, pp. 1-8, Mar. 2, 2021.
Acknowledgment of receipt, Submission No. 9560700, Application No. EP17734756.4, European Patent Application No. EP3481216, Mar. 3, 2021.
Acknowledgment of receipt, Submission No. 9561629, Application No. EP17734756.4, European Patent Application No. EP3481216, Mar. 3, 2021.
Communication of a Notice of Opposition in European Patent Application No. 3481216, mailed Mar. 4, 2021.
Communication of a Notice of Opposition in European Patent Application No. 3481216, mailed Mar. 10, 2021.
"Guide to Calf Milk Replacers: Types, Use and Quality," Bovine Alliance on Management & Nutrition (BAMN Publication), 2008.
14th International Rapeseed Congress—Abstracts, 2015, pp. 120-147.
Communication of a Notice of Opposition in EP App. No. 17734757.2 dated Feb. 4, 2021.
Declaration of Kevin Segall dated Dec. 23, 2020.
Declaration of Kevin Segall dated Jan. 27, 2021.
"Determination of Soluble Crude Protein May 23, 2013". Available online at http://norfor.info/files/pdf-dokumenter/pdf_lab/Analyses/NorFor_Soluble_Crude_Protein_2013-05-23.pdf on May 23, 2013 (Year: 2013).
Fukushima et al., "Denaturation of Soybean Proteins by Organic Solvents," Soybean Protein Denaturation, Mar. 1969, vol. 46, 156-163. (Year: 1969).
Krishnamoorthy, Upoor and John Moran, "Rearing Young Ruminants on Milk Replacers and Starter Feeds," FAO Animal Production and Health Manual, 2011.

(56) References Cited

OTHER PUBLICATIONS

Nickerson, Michael, "Protein Functionality Testing Manual," 2012, University of Saskatchewan.

Rezig et al., "Pumpkin (*Cucurbita maxima*) Seed Proteins: Sequential Extraction Processing and Fraction Characterization," Journal of Agricultural and Food Chemistry, 2013, 61(32), 7715-7721. (Year: 2013).

International Search Report of International Patent Application No. PCT/EP2016/080234 dated Feb. 10, 2017.

International Search Report of International Patent Application No. PCT/EP2017/066869, dated Feb. 8, 2017.

Pudel et al., "Production and properties of rapeseed albumin," Lipid Technology, (2015), vol. 27, No. 5: 112-114.

J. Kroll, "Selected functional properties of detoxified eapeseed protein preparations effected by phytic acid," Die Nahrung—Food, (1991) vol. 35, No. 6: 619-624.

Kodagoda, et al., "Some Functional Properties of Rapeseed Protein Isolates and Concentrates," Can. Inst. Food Sci. Technol. J., (1973), vol. 6, No. 4: 266-269.

Kroll et al., "Beeinflussung funktioneller Eigenschaften von Proteinen durch gekoppelte mechanolytische und chemische Modifizierung," Die Nahrung—Food, (1984), vol. 28, No. 4: 389-396.

"The French have set off a trend of "detoxification" when they eat, and they can't even have gluten," European Times, published Nov. 13, 2015, 7 pages.

Wang, Xiao-hua, "Discussion on the oil making technology of imported rapeseed", Cereals & Oils, Issue 1, pp. 23-24, published on Dec. 31, 1999.

Rebuttal to Kevin Segall declaration submitted in EP opposition, dated Jun. 2, 2021, 1 page.

Decision rejecting opposition in oral proceedings of EP application No. 17735153.3, dated Mar. 9, 2022, 1 page.

\* cited by examiner

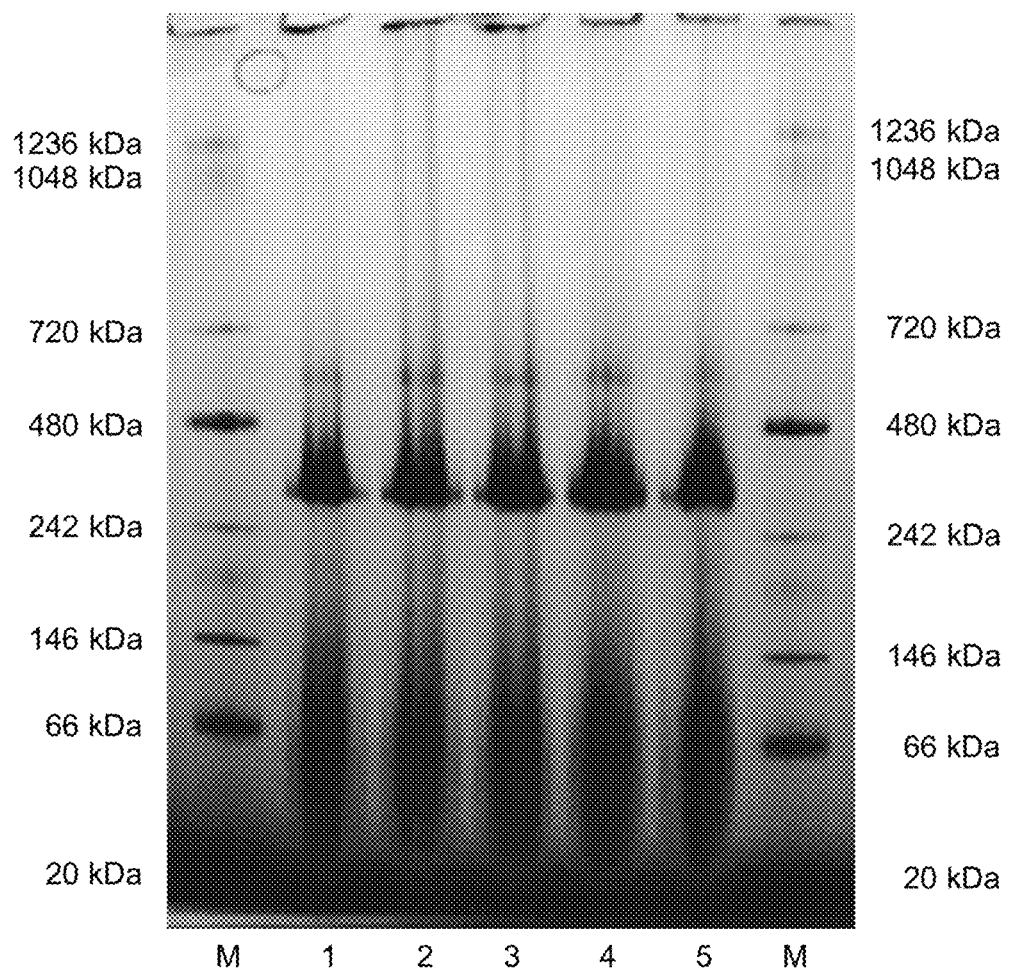

PROCESS FOR MAKING A SOLUBLE RAPESEED PROTEIN ISOLATE

CROSS REFERENCE TO RELATED APPLICATIONS

This application is a National Stage entry of International Application No. PCT/EP2017/066871 filed 06 Jul. 2017, which claims priority to European Patent Application No. 17166993.0, filed 19 Apr. 2017 and to European Patent Application No. 16178345.1, filed 07 Jul. 2016.

BACKGROUND

Field

The present invention is directed to a process for making a soluble native rapeseed protein isolate and the soluble native rapeseed protein isolate obtained by the process.

Description of Related Art

Protein is a main feature of human nutrition. This may be sourced from animals (e.g. meat, fish, egg, dairy) or vegetables. There is a general desire to reduce the amount of animal based protein. The use of egg protein is often undesirable. For example, due to problems with egg allergies, medical problems associated with cholesterol levels in eggs, religious restrictions/convictions, culinary preferences (such as, for example, a vegetarian or a vegan diet), cost fluctuations in the price of eggs, use of antibiotics and hormones in poultry production, and diseases associated with poultry (such as, for example, bird flu), the use of alternative proteins may be desired. The use of vegetable based protein in human nutrition is known, for example WO 2008/094434 discloses the use of wheat protein isolates as an alternative to the use of egg yolk protein in compositions. However, the use of wheat protein isolates may not be desirable for those with gluten allergies. The use of soy based protein instead of whey protein has also been described for example in WO 2014/018922. Soy protein is widely used, however in view of some intolerances to soy products there is a need to find other sources of vegetable proteins.

Suitable alternatives include pea protein and rapeseed protein. Rapeseed seeds are rich in oil and contain considerable amounts of protein that accounts for 17 to 25% of seed dry weight. Processing rapeseed for oil for human consumption produces rapeseed meal (60%) as a by-product which contains about 30 to 40% protein. The rapeseed used for this purpose is usually of the varieties *Brassica napus* and *Brassica juncea*. These varieties contain only low levels of erucic acid and glucosinolates, and are also known as Canola. Canola is a contraction of Canada and "ola" (for "oil low acid"), but is now a generic term defined as rapeseed oil comprising <2% erucic acid and <30 mmol/g glucosinolates. The resultant rapeseed meal is currently used as a high-protein animal feed.

Proteins are available as hydrolysates, concentrates and isolates. Hydrolysates are proteins that have been partially broken down by exposing the protein to heat, acid or enzymes that break apart the bonds linking amino acids. This makes it taste more bitter, but also allows it to be absorbed more rapidly during digestion than a native (non-hydrolyzed) protein. Isolates are purer than concentrates, meaning other non-protein components have been partially removed to "isolate" the protein. Many concentrates are around 80% protein, which means that on a dry basis, 80% of the total weight is protein. Isolates are typically around 90% protein (dry basis). This is calculated using the Kjeldahl method.

The predominant storage proteins found in rapeseed are cruciferins and napins. Cruciferins are globulins and are the major storage protein in the seed. A cruciferin is composed of 6 subunits and has a total molecular weight of approximately 300 kDa. Napins are albumins and are low molecular weight storage proteins with a molecular weight of approximately 14 kDa. Napins are more easily solubilized and in for example EP 1715752 B1 a process is disclosed to separate out the more soluble napin fraction, preferably to at least 85 wt. %. Napins are primarily proposed for use in applications where solubility is key.

Rapeseed proteins can also be divided into various fractions according to the corresponding sedimentation coefficient in Svedberg units (S). This coefficient indicates the speed of sedimentation of a macromolecule in a centrifugal field. For rapeseed proteins, the main reported fractions are 12S, 7S and 2S. Cruciferin and napin are the two major families of storage proteins found in rapeseed. Napin is a 2S albumin, and cruciferin is a 12S globulin. Furthermore, Schwenke and Linow (A reversible dissociation of the 12S globulin from rapeseed (*Brassica napus* L.) depending on ionic strength, Nahrung (1982) 26, K5-K6) state that the cruciferin complex is present as a 300 kDa 12S hexamer when exposed to higher ionic strength ($\mu \geq 0.5$ mS/cm), and reversibly dissociates into 7S trimeric molecules of 150 kDa when exposed to low ionic strength conditions.

It has been found that high purity rapeseed protein isolate has a broadly-based functionality in food products, unique among proteinaceous materials. The ability to utilize a protein which is vegetable in origin in food products enables truly vegetarian food products to be provided in instances where egg white and/or animal-derived protein have been used in the absence of any available substitute.

The rapeseed protein isolate may be used in conventional applications of protein isolates, such as protein fortification of processed foods, emulsification of oils, body formers in baked foods and foaming agents in products which entrap gases. The rapeseed protein isolate also has functionalities not exhibited by the source material and isoelectric precipitates. The rapeseed protein isolate has certain functionalities including the ability to be formed into protein fibers and to be used as a protein substitute or extender in food products where animal protein or other plant proteins are used. As described herein, the rapeseed protein isolate has additional functionalities.

EP 1389921 B1 discloses a process of forming a food composition, which comprises extracting rapeseed oil seed meal with an aqueous food-grade salt solution at a temperature of at least 5° C. to cause solubilization of protein in the rapeseed oil seed meal and to form an aqueous protein solution having a protein content of 5 to 30 g/l and a pH of 5 to 6.8, and subsequently two protein fractions are separated out via micelles. This is done to improve solubility as the 12S fraction is usually considered as less soluble over a wide pH range when not in the presence of a salt. The resultant protein isolate is incorporated in said food composition in substitution for egg white, milk protein, whole egg, meat fibers, or gelatin. A similar micelle fractionation approach is disclosed in US 2010/041871 leading to separate fractions of cruciferin and napin. DE 10 2014 005466 A1 also describes a process for obtaining purified cruciferin and napin fractions. During the process, also a protein mixture of the two with 55-60% napins and 40-45% cruciferins is obtained. The solubility of this protein mixture is approximately 75%.

WO 2013/000066 discloses rapeseed protein products having a protein content of at least about 60 wt. % with a low phytic acid content, with a preference for equal portions of 2S and 7S with a minor content of 12S.

EP 1720415 discloses a process for preparing a rapeseed protein isolate for an aquaculture feed composition comprising 25 to 55 wt. % of 2S rapeseed protein, 47 to 75 wt. % of 7S rapeseed protein and 0 to 15 wt. % of 12S rapeseed protein. This process requires the use of high levels of salt, which is of no issue in aquaculture but not suitable for human nutrition.

One of the main problems associated with the prior art products and processes is that highly soluble (i.e. having a solubility >80%, preferably >85%, more preferably >90%) rapeseed protein isolates can only be obtained through fractionation processes wherein (parts of) the 7S and/or 12S fractions are removed. There is therefore a need to achieve highly soluble rapeseed protein isolates without having to perform additional fractionation steps that have as additional disadvantage that part of the valuable protein is wasted.

SUMMARY

Traditionally, for materials having relatively high oil content (>35% on dry matter, rapeseed is ~40%), a combination of mechanical pressing and solvent extraction is used for efficient extraction of the oil (Rosenthal et al., Enzyme and Microbial Technology 19 (1996) 402-420). After extraction, the pressed material is heat treated to remove the solvent, resulting in a meal (also referred to as cake) with an oil and protein content of 1-5% and 40-50% of the dry matter, respectively. Although the meal has a relative high protein content, the quality is reduced significantly resulting from the harsh conditions (i.e., elevated temperature, solvents) employed during the oil extraction. The awareness that these oil extraction conditions are detrimental for the quality of the proteins is one of the factors bolstering the improvement of the cold pressing technology. During cold-pressing, no solvents (like e.g. hexane) are used and the oil is pressed out under mild conditions, resulting in better quality oil and an oilseed pressed meal of higher quality. This oilseed pressed meal has a relatively high oil content (typically >8%, for example >10%, on dry matter basis) and is an excellent source of proteins with preserved functionality. These proteins can be readily extracted from the meal by for instance an aqueous extraction (Rosenthal et al., Enzyme and Microbial Technology 19 (1996) 402-420, Rosenthal et al., Trans iChemE, Part C, 76 (1998) 224-230 and Lawhon et al., J. Food Sci. 46 (1981) 912-916). One of the biggest challenges of this type of processes is that during extraction proteins and oil are extracted concomitantly. This leads to an extract containing a significant amount of oil, present in most cases partly as a stable emulsion making its removal quite difficult. WO 2014/147068 discloses mild extraction of cold-pressed rapeseed meal to obtain protein-rich extracts that are practically fat-free.

We have found that in our process, based on cold-pressed rapeseed meal, there is no need to separate out the protein constituents and yet an unprecedented solubility across a broader pH range can be achieved and maintained. The hypothesis that solubility of rapeseed protein isolate can only be improved by reducing the amount of proteins with lower solubility, such as cruciferins or 12S proteins, appears therefore not exclusive since the nature of the starting material and the process steps of the instant invention yield the same favorable result.

It has been found that the use of soluble native rapeseed protein isolate comprising both cruciferins and napins, obtained according to the present invention after mild extraction of rapeseed oil meal obtained using the cold-press method mentioned above, gave surprisingly good results when used to replace other proteins fully or partially.

In a first aspect of the invention, there is provided a process for obtaining a native rapeseed protein isolate comprising the steps of:

i) mixing cold-pressed rapeseed oil meal with an aqueous liquid at a temperature of from 45 to 65° C.;
ii) separation of the aqueous liquid from the mixture obtained in step i);
iii) decreaming of the aqueous liquid obtained in step ii);
iv) adjusting the pH of the decreamed aqueous liquid obtained in step iii) to neutral by adding acid or base, and mixing with a precipitant to obtain a precipitate;
v) removing the precipitate obtained in step iv) to obtain an aqueous liquid;
vi) concentrating and washing the aqueous liquid obtained in step v);
vii) isolating native rapeseed protein isolate from the concentrated and washed aqueous liquid obtained in step vi) by means of drying.

The native rapeseed protein isolate is produced from rapeseed cold-pressed cake/meal, the by-product of rapeseed oil production.

BRIEF DESCRIPTION OF THE DRAWINGS

FIG. 1 shows Blue Native PAGE gels applied to rapeseed protein isolates from five different batches obtained in Example 1 (lanes 1-5). Lanes M are marker bands for determination of the molecular weights as displayed along the vertical axes.

DETAILED DESCRIPTION OF A PREFERRED EMBODIMENT

Steps i) to vii) are preferably carried out subsequently, i.e. in the order in which they are mentioned above.

In step i), preferably the aqueous liquid is an aqueous salt solution. More preferably the aqueous salt solution comprises sodium chloride. Most preferably the aqueous salt solution comprises 1 to 5% sodium chloride (w/w). Preferably the extraction time is in the range of from 5 to 60 minutes, more preferably in the range from 30 to 60 minutes. Preferably during extraction, the protein:fat ratio in the protein rich liquid phase is maintained above 12. Preferably the extracted rapeseed oil meal is washed with aqueous extraction liquid at a ratio of from 1:2 to 1:30, more preferably of from 1:4 to 1:25, still more preferably of from 1:5 to 1:20 (w/w).

In step ii), the separation may be carried out using any means known in the art including filtration and centrifugation. For example, standard filters, a filter press, a belt filter or other filters or centrifuges may be used, preferably at reduced pressure, i.e. of from −0.8 to −0.1 bar. Preferably the extraction temperature of from 45 to 65° C. is maintained.

In one embodiment, the mixing in step i) and the separating in step ii) may be carried out according to gravity-induced solid-liquid extraction as described in WO 2014/147068.

In step iii), preferably the aqueous extraction liquid containing the proteins is decreamed using centrifugation. Alternatively, filtration may be used. Preferably the fat level is reduced by at least 50% (w/v). The removal is measured with the decrease in concentration, while keeping the volume (reasonably) constant as about between 0.5 to 5% of the volume is removed as "cream".

In step iv) the precipitant may comprise several divalent ions including salts of magnesium, zinc, iron, and calcium. Preferably an aqueous calcium chloride solution is used, as advocated in the prior art, for example in US 2014/256914 (albeit for precipitation in pulse pea protein, a different species). Preferably the final concentration of the calcium chloride solution in the extract is in the range of from 0.1 to 50 g/L, more preferably in the range from 0.1 to 40 g/L, especially in the range from 0.2 to 30 g/L and most especially in the range from 1 to 20 g/L. The mixing with the precipitant can take place before, during or after pH adjustment. pH adjustment is to neutral, preferably to a value between pH 6.0 and pH 8.0, more preferably to a value between pH 6.2 and pH 7.2.

In step v), the precipitate (e.g. the phytate salt of calcium, magnesium, iron, zinc, or the like) may be removed by any of several methods including filtration, centrifugation, or the addition of enzymes such as phytases.

In step vi), preferably concentration is carried out by ultrafiltration to reach a concentration of at least 6×. Preferably washing is carried out by diafiltration water using approximately 10 times the volume of the concentrate. For example, if the initial volume is 300 L, the liquid is concentrated to about 50 L (6× concentration), and is then washed with 500 L (10×) of water. Preferably the washing is carried out at a temperature in the range of from 45 to 65° C. using an 8 to 12 kDa polyether sulfone PES membrane. Alternatively, a regenerated cellulose may also work Cold ultrafiltration may also be used. Preferably the washing is carried out using a 0.5 to 2% sodium chloride solution followed by a 0.015% to 0.4% sodium chloride solution. Alternatively, the second wash may be with distilled water.

In step vii) the drying is preferably carried out using standard drying techniques such as evaporation, lyophilization, spray-drying and the like, with or without the application of reduced pressure. Preferably spray drying is used.

Preferably the rapeseed protein isolate is obtained in a process without a fractionating step for separating out cruciferins and napins.

Preferably the native rapeseed protein isolate is obtained in a process where the levels of napin and cruciferin are kept substantially constant within the claimed range (i.e. neither the napin (2S) or cruciferin levels (12S) are deliberately increased). Preferably the native rapeseed protein isolate comprises at least 5% (on dry matter) 12S rapeseed protein where the presence of 12S is verified by Blue Native PAGE. More preferably the native rapeseed protein isolate comprises at least 10%, most preferably at least 15%, especially at least 25% and most especially at least 65% (on dry matter) of 12S rapeseed protein where the presence of 12S is verified by Blue Native PAGE.

In a second aspect, the invention provides a native rapeseed protein isolate obtained by a process according to the first aspect of the invention comprising 40 to 65% cruciferins and 35 to 60% napins and having a solubility of at least 88% when measured over a pH range from 3 to 10 at a temperature of 23±2° C.

Preferably the native rapeseed protein isolate has a solubility of at least 88% and more preferably at least 92% when measured over a pH range from 3 to 10 at a temperature of 23±2° C. Preferably, the native rapeseed protein isolate has a solubility equal to or at least 93% when measured in water over a pH range from 6 to 9 at a temperature of 23±2° C. This is also known as the soluble solids index (SSI).

In one embodiment, the native rapeseed protein isolate comprises at least 5% (on dry matter) 12S rapeseed protein where the presence of 12S is verified by Blue Native PAGE.

For use in human food consumption the native rapeseed protein isolate preferably comprises a low level of salt. This is measured by the conductivity. Preferably the conductivity of the native rapeseed protein isolate in an aqueous 2% solution is less than 9,000 µS/cm over a pH range of 2 to 12. More preferably the conductivity of the native rapeseed protein isolate in a 2% aqueous solution is less than 4,000 µS/cm over a pH range of 2.5 to 11.5. For comparison, the conductivity of a 5 g/L sodium chloride aqueous solution is around 9,400 µS/cm.

Preferably the native rapeseed protein isolate has a phytate level less than 0.4 wt. %, more preferably less than 0.3 wt. % and most preferably less than 0.15 wt. %.

Preferably the native rapeseed protein isolate has a protein content of at least 90 wt. % (calculated as Kjeldahl N×6.25) on a dry weight basis, more preferably at least 94 wt. %, most preferably at least 96 wt. % and especially at least 98 wt. %.

Preferably the native rapeseed protein isolate is unhydrolyzed.

EXAMPLES

Test Methods

Protein Content

Protein content was determined by the Kjeldahl method according to AOAC Official Method 991.20 Nitrogen (Total) in Milk, using a conversion factor of 6.25 was used to determine the amount of protein (% (w/w)).

Conductivity

The conductivity of native rapeseed protein isolate in a 2 wt. % aqueous solution was measured using a conductivity meter: Hach sensION+ EC71.

Solubility Test

The below solubility test is adapted from Morr et al. (J. Food Sci. (1985) 50, 1715-1718), the difference being the use of water instead of 0.1 M sodium chloride.

Sufficient protein powder to supply 0.8 g of protein was weighed into a beaker. A small amount of demineralized water was added to the powder and the mixture was stirred until a smooth paste was formed. Additional demineralized water was then added to make a total weight of 40 g (yielding a 2% w/w protein dispersion). The dispersion was slowly stirred for at least 30 min using a magnetic stirrer. Afterwards the pH was determined and adjusted to the desired level (2, 3, 4, etc.) with sodium hydroxide or hydrochloric acid. The pH of the dispersion was measured and corrected periodically during 60 minutes stirring. After 60 minutes of stirring, an aliquot of the protein dispersion was reserved for protein content determination (Kjeldahl analysis). Another portion of the sample was centrifuged at 20,000 g for 2 min. The supernatant and pellet were separated after centrifugation. The protein content was also determined by Kjeldahl analysis.

Protein solubility (%)=(protein in supernatant/protein in total dispersion)×100.

Alternative methods for determining solubility are available and in some case use buffers, like borate-phosphate buffer in WO 2011/057408. However, such as values are incomparable with the ones obtained in the instant application that are determined in the absence of buffer.

MW Determination by Blue Native PAGE

In the case of Native PAGE the protein charge has an impact on the electrophoretic mobility. In the case of Blue native PAGE (and to the contrary of clear native PAGE), the Coomassie Brilliant Blue dye provides the necessary charges to the protein complexes for the electrophoretic separation. The proteins were dissolved in 500 mM sodium chloride. As high salt concentrations are incompatible with electrophoretic separation, the sample was diluted 10-fold with water (final salt concentration: 50 mM). Coomassie® G-250 (SimplyBlue™, ThermoFischer Scientific) was used and gels were scanned with an ExQuest™ Spot Cutter (BioRad). Resultant bands after carrying out Blue Native PAGE were observed. It would be expected that bands around 14 kDa indicate 2S, around 150 kDa indicate 7S and around 300 kDa indicate 12S proteins.

Cruciferin/Napin (C/N) Ratio

The C/N ratio was determined by Size Exclusion Chromatography (SEC) analysis. Samples were dissolved in a 500 mM sodium chloride saline solution and analyzed by HP-SEC using the same solution as the mobile phase. Detection was done by measuring UV absorbance at 280 nm. The relative contribution of cruciferin and napin (%) was calculated as the ratio of the peak area of each protein with respect to the sum of both peak areas.

Phytate Level

Phytates were measured at Eurofins using method QD495, based on Ellis et al. (Anal. Biochem. (1977) 77, 536-539).

Example 1

Preparation of Rapeseed Protein Isolate from Cold-Pressed Rapeseed Oil Seed Meal The rapeseed protein isolate was produced from cold-pressed rapeseed oil seed meal having an oil content of less than 15% on dry matter basis, cleaned and processed below 75° C.

In the extraction step, the cold-pressed rapeseed oil seed meal was mixed with an aqueous salt solution (1 to 5% sodium chloride), at a temperature between 40 to 75° C. The meal to aqueous salt solution ratio was in the range of from 1:5 to 1:20. After about 30 minutes to 1 hour the protein rich solution (extract) was separated from the insoluble material. The pH of the extract was adjusted to neutral and the extract was further processed to clarify the material and remove non-protein substances. In the decreaming step, the residual fat was removed using centrifugation. Non-protein substances were removed by adjusting the pH of the material to neutral in the presence of a salt with which phytate precipitates (e.g. calcium chloride). The formed precipitate is removed via a solid/liquid separation step (e.g. a membrane filter press or centrifugation) in which the impurities are removed in a solid salt form (e.g. calcium phytate). The extract was then concentrated and washed in an ultrafiltration/diafiltration (UF/DF) step. Finally, the washed concentrate was dried in a spray drier with an inlet temperature in the range of from 150 to 200° C. and an outlet temperature in the range of from 50 to 100° C. resulting in the rapeseed protein isolate. Several batches were prepared and tested.

The conductivity of the resultant native rapeseed protein isolates in a 2% solution was less than 4,000 μS/cm over a pH range of 2.5 to 11.5.

Blue Native PAGE: Main bands were observed roughly around 300 kDa, between the 242 and 480 kDa MW markers (FIG. 1). Some staining was visible as a smear as lower MW (150 kDa and below). No clear bands were observed at 150 kDa. Based on these results, the rapeseed product contains the 12S form of cruciferin.

The resultant native rapeseed protein isolate comprised in the range of from 40 to 65% cruciferins and 35 to 60% napins.

The resultant native rapeseed protein isolate contained less than 0.26 wt. % phytate.

The resultant native rapeseed protein isolates had a solubility of at least 88% when measured over a pH range from 3 to 10 at a temperature of 23±2° C. as shown for two batches in the below table.

| pH | 3 | 4 | 5 | 6 | 7 | 8 | 9 | 10 |
|---|---|---|---|---|---|---|---|---|
| Sample 1 Solubility (%) | 98 | 96 | 89 | 95 | 95 | 97 | 97 | 98 |
| Sample 2 Solubility (%) | 102.5 | 97.5 | 94.3 | 93.9 | 97.0 | 93.0 | 94.0 | 99.8 |

The invention claimed is:

1. A process for obtaining a native rapeseed protein isolate comprising:
   i) mixing cold-pressed rapeseed oil meal with an aqueous liquid at a temperature of from 45 to 65° C.;
   ii) separation of the aqueous liquid from the mixture obtained in i);
   iii) decreaming of the aqueous liquid obtained in ii) by centrifugation or filtration;
   iv) adjusting the pH of the decreamed aqueous liquid obtained in iii) to neutral by adding acid in the presence of a precipitant to obtain a precipitate;
   v) removing the precipitate obtained in iv) to obtain an aqueous liquid;
   vi) concentrating and washing the aqueous liquid obtained in v);
   vii) isolating native rapeseed protein isolate from the concentrated and washed aqueous liquid obtained in vi) by means of drying,
wherein said rapeseed protein isolate comprises 40 to 65% of cruciferins and 35 to 60% of napins and wherein said rapeseed protein isolate has a solubility of at least 88% in water when measured over a pH range from 3 to 10 at a temperature of 23±2° C.

2. The process according to claim 1 wherein in i) said mixing is carried out such that the ratio between said cold-pressed rapeseed oil meal and said aqueous liquid is from 1:2 to 1:30 (w/w).

3. The process according claim 1 wherein in i) the aqueous liquid is an aqueous salt solution comprising 1 to 5% sodium chloride (w/w).

4. The process according to claim 1 wherein in iii) said decreaming is carried out by means of centrifugation.

5. The process according to claim 1 wherein in iv) said precipitant is an aqueous calcium chloride solution.

6. The process according to claim 1 wherein in vi) said concentrating and washing is carried out by means of ultrafiltration and diafiltration.

7. A native rapeseed protein isolate obtained by a process according to claim 1 comprising 40 to 65% cruciferins and 35 to 60% napins and having a solubility of at least 88% in water when measured over a pH range from 3 to 10 at a temperature of 23±2° C.

8. The native rapeseed protein isolate according to claim 7 having a solubility of at least 92% when measured over a pH range from 6 to 9 at a temperature of 23±2° C.

9. The native rapeseed protein isolate according to claim 7 wherein the native rapeseed protein isolate comprises at least 5% (on dry matter) 12 S rapeseed protein where the presence of 12 S is verified by Blue Native PAGE.

10. The native rapeseed protein isolate according to claim 7 having a conductivity in a 2 wt. % aqueous solution of less than 9,000 μS/cm over a pH range of 2 to 12.

11. The native rapeseed protein isolate according to claim 7 comprising less than 20% on dry matter of 7 S rapeseed protein.

12. The native rapeseed protein isolate according to claim 8 with a cruciferin/napin ratio of from 0.9 to 1.3.

13. The native rapeseed protein isolate according to claim 7 with a protein content of at least 90 wt. % on a dry weight basis.

\* \* \* \* \*